United States Patent [19]

Cheresnowsky

[11] Patent Number: 4,885,144

[45] Date of Patent: Dec. 5, 1989

[54] PROCESS FOR PURIFYING MOLYBDENUM

[75] Inventor: John Cheresnowsky, Towanda, Pa.

[73] Assignee: GTE Products Corporation, Stamford, Conn.

[21] Appl. No.: 99,266

[22] Filed: Sep. 21, 1987

[51] Int. Cl.$^4$ .................. C01G 39/00; B01D 11/14
[52] U.S. Cl. ........................... 423/54; 423/56; 423/58; 423/606
[58] Field of Search ............... 423/54, 56, 58, 606

[56] References Cited

U.S. PATENT DOCUMENTS

| | | | |
|---|---|---|---|
| 3,829,550 | 8/1974 | Ronzio et al. | 423/56 |
| 3,848,049 | 11/1974 | Ronzio et al. | 423/127 |
| 4,273,745 | 6/1981 | Laferty et al. | 423/58 |
| 4,278,644 | 7/1981 | Rappas et al. | 423/58 |
| 4,298,582 | 11/1981 | Menashi et al. | 423/58 |
| 4,320,094 | 3/1982 | Menashi et al. | 423/58 |
| 4,525,331 | 7/1985 | Cheresnowsky et al. | 423/58 |
| 4,555,386 | 11/1985 | Cheresnowsky | 423/58 |
| 4,587,109 | 5/1986 | Lyaudet et al. | 423/56 |
| 4,596,701 | 6/1986 | Cheresnowsky et al. | 423/58 |
| 4,601,890 | 7/1986 | Cheresnowsky | 423/58 |
| 4,604,266 | 8/1986 | Cheresnowsky et al. | 423/58 |
| 4,604,267 | 8/1986 | Cheresnowsky | 423/58 |
| 4,702,895 | 10/1987 | Cheresnowsky | 423/54 |

Primary Examiner—Robert L. Stoll
Assistant Examiner—Paige Harvey
Attorney, Agent, or Firm—Donald R. Castle

[57] ABSTRACT

A process is disclosed for purifying molybdenum which involves adding to an acidic slurry of molybdenum trioxide, a source of magnesium ions in a solid form, with the amount of magnesium and the magnesium ion concentration in the subsequently formed ammonium molybdate solution being sufficient to subsequently form insoluble compounds containing greater than about 80% by weight of the arsenic and greater than about 80% by weight of the phosphorus, and ammonia in an amount sufficient to subsequently dissolve the molybdenum and subsequently form the insoluble compounds, digesting the resulting ammoniated slurry at a temperature sufficient to dissolve the molybdenum and form an ammonium molybdate solution while the pH is maintained at from about 9 to about 10 to form a solid containing the insoluble compounds, and separating the solid from the ammonium molybdate solution.

5 Claims, No Drawings

PROCESS FOR PURIFYING MOLYBDENUM

This invention relates to a process for purifying molybdenum. More particularly, it relates to a process for purifying molybdenum of the impurities of arsenic and phosphorus by adding magnesium ions to a slurry of molybdenum trioxide, either before or after addition of ammonia to produce insoluble compounds of arsenic and phosphorus.

BACKGROUND OF THE INVENTION

Sources of molybdenum such as impure or technical grade molybdenum trioxide are often contaminated with phosphorus and/or arsenic. These impurities are difficult to remove and are often present as contaminants in molybdenum compounds where they result in inferior quality of molybdenum products. For example, phosphorus in ammonium dimolybdate shows up in the subsequently produced molybdenum metal. Phosphorus at a level of about 40 ppm in molybdenum powder causes a decrease in the rolling efficiency of molybdenum.

Therefore a method to remove impurities such as phosphorus and arsenic from molybdenum would be advantageous because it would allow processing of a wide variety of molybdenum sources.

U.S. Pat. No. 3,829,550 discloses a process for producing a high purity molybdenum trioxide and/or ammonium molybdate product whereby an oxidized molybdenite concentrate is subjected to an ammonium hydroxide leaching step including a digestion phase in which an oxidation of some of the impurities therein, particularly iron, is effected, resulting in a coprecipitation of iron and aluminum hydroxide, together with other impurities including lead, bismuth, tin, arsenic, phosphorus, soluble silica, and the like. The resultant aqueous solution containing ammonium molybdate is filtered and thereafter crystallized, followed by calcining to produce a high purity molybdenum trioxide. This molybdenum trioxide can be further purified by digestion in dilute nitric acid solution to effect a further leaching of residual contaminants, and thereafter the molybdenum trioxide is redissolved in an aqueous ammonium hydroxide solution which is filtered and subsequently crystallized to produce a high purity ammonium molybdate.

U.S. Pat. No. 4,273,745 relates to a process for recovering molybdenum from ammonium molybdate solution containing phosphate ions by digesting in an ammonium molybdate solution at least one water soluble compound of aluminum, calcium, iron or magnesium to precipitate phosphate, and thereafter processing the molybdenum to produce ammonium polymolybdate. Removal of arsenic with magnesium is not discussed in this patent.

U.S. Pat. Nos. 4,278,644 and 4,298,582 relate to processes for recovering chromium, vanadium, molybdenum, and tungsten from secondary resources such as alloy scrap comprising a refractory metal and base metals such as cobalt, nickel, iron, and copper. There is a phosphorus removal step. However, the ammonia content is far below that of the present invention. Furthermore, the phosphorus is reduced to less than 0.02 g P/l. The present invention starts with less than this.

U.S. Pat. No. 4,320,094 relates to recovery of refractory and base metals from superalloy scrap. It provides a solution suitable for subsequent hydrometallurgical recovery of the metals. This patent teaches removal of phosphate from alkaline alkali metal solution.

SUMMARY OF THE INVENTION

In accordance with one aspect of this invention, there is provided a process for purifying molybdenum which involves adding to an acidic slurry of molybdenum trioxide, a source of magnesium ions in a solid form, with the amount of magnesium and the magnesium ion concentration in the subsequently formed ammonium molybdate solution being sufficient to subsequently form insoluble compounds containing greater than about 80% by weight of the arsenic and greater than about 80% by weight of the phosphorus, and ammonia in an amount sufficient to subsequently dissolve the molybdenum and subsequently form the insoluble compounds, digesting the resulting ammoniated slurry at a temperature sufficient to dissolve the molybdenum and form an ammonium molybdate solution while the pH is maintained at from about 9 to about 10 to form a solid containing the insoluble compounds, and separating the solid from the ammonium molybdate solution.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The invention provides a process for removing arsenic and phosphorus from molybdenum by precipitation of insoluble magnesium ammonium compounds of arsenic and phosphorus from ammonium molybdate solution. The advantage of the present invention is that addition of the magnesium ion is incorporated into the process for producing ammoniacal molybdenum compounds from impure molybdenum trioxide by being added directly to the starting molybdenum trioxide slurry, in contrast with prior art techniques of adding the magnesium source as a separate step to the ammonium molybdate solution thus formed. In this way, an extra processing step is saved along with cost savings.

A source of magnesium ions in the solid form is added to an acidic slurry of molybdenum trioxide. The amount of magnesium ions and the magnesium ion concentration in the subsequently formed ammonium molybdate solution is sufficient to subsequently form insoluble compounds containing greater than about 80% by weight of the arsenic and greater than about 80% by weight of the phosphorus which may be contained therein. Ammonia is added in an amount sufficient to subsequently dissolve the molybdenum and subsequently form the insoluble compounds.

The starting molybdenum of this invention is molybdenum trioxide most typically in the impure form such as technical grade material. Most typically the molybdenum trioxide contains from about 1 to about 100 weight parts per million (ppm) phosphous and from about 1 to about 120 weight ppm of arsenic.

The molybdenum trioxide can be pre-treated if desired to remove some impurities by acid digestion. In this pre-treatment, the molybdenum trioxide is acid digested at a temperature of from about 75° C. to about 85° C. for a length of time of from about 2 hours to about 2½ hours. Most preferably a nitric acid system is used which is most typically about 2 molar in nitric acid. The bulk of the acid is then removed from the molybdenum usually by being decanted off. The acid digested molybdenum is then water washed most typically by being slurried with water one or more times. This is done most typically at about 60° C. for about 30 minutes for each separate wash. The wash water is then removed usually by filtration or decantation from molybdenum trioxide after the oxide has been allowed to settle. In accordance with a preferred embodiment, water is then added to the washed molybdenum trioxide. This acid slurry can be used as the starting acidic slurry of the present invention.

Although the above has been described as a preferred method of obtaining the acidic molybdenum slurry, it is to be understood that an acid slurry of the molybdenum trioxide can be formed in any way.

An oxidizing agent can be added to this slurry. Most typically the oxidizing agent is hydrogen peroxide. This is done to insure that the Mo and any Fe present are in their highest oxidation states which is advantageous in further processing steps.

A source of magnesium ions is added to this slurry with the amount of magnesium being sufficient to subsequently form insoluble compounds with the major portion of any arsenic and phosphorus which are present. Some preferred sources of magnesium ions are magnesium oxide, magnesium hydroxide, magnesium carbonate, magnesium nitrate, magnesium chloride, magnesium sulfate, and combinations of these. It is preferred to have the source of magnesium from the first three because there is no contamination from anions. The amount of magnesium is typically sufficient to result in a magnesium concentration of from about 0.005 to about 0.04 moles Mg/l in the molybdate solution.

Ammonia is added to the slurry in an amount sufficient to dissolve the molybdenum and to provide sufficient ammonium ions to subsequently form the insoluble compounds of arsenic and phosphorus. The ammonia is added most typically in the form of ammonium hydroxide solution.

The sequence of addition of the components of the slurry can be varied. For example, the magnesium ions can be added either before or after the addition of the ammonia or together with the ammonia. However, when magnesium oxide, magnesium hydroxide, magnesium carbonate or combinations of these are used, it is preferred to add them to the acid slurry and thereafter to add the ammonia.

The resulting ammoniated slurry is then digested at a temperature and time sufficient to dissolve the molybdenum and form the insoluble compounds while the pH is maintained at from about 9 to about 10 by addition of more ammonia as needed. The digestion temperature is usually about 55° C. and the time is about 2.5 hours.

As a result of the digestion, the molybdenum is converted to ammonium molybdate and the major portion of the arsenic and phosphorus are precipitated as their magnesium ammonium salts, which are believed to be magnesium ammonium arsenate and magnesium ammonium phosphate respectively.

The ammonium molybdate is separated from the digestion solids which contain the insoluble phosphorus and arsenic compounds, by standard techniques such as filtration.

The molybdenum can be recovered from the resulting ammonium molybdate by standard methods such as described in U.S. Pat. Nos. 4,604,266 and 4,525,331.

The arsenic content of the purified molybdenum compound is typically less than about 8 weight ppm and the phosphorus content is less than about 10 weight ppm.

To more fully illustrate this invention, the following nonlimiting examples are presented.

EXAMPLE 1

About 3 gallons of about 50% by weight hydrogen peroxide is added to an acid slurry of technical grade molybdenum trioxide to keep the Mo and the Fe in their highest oxidation states. Ammonium hydroxide is added to dissolve the molybdenum trioxide and to provide $NH_4^+$ ions. The resulting ammoniated slurry is stirred for about 30 minutes without heating after which it is heated to about 60° C. About 64 pounds of $Mg(NO_3)_2 \cdot 6H_2O$ as a 1.5 molar solution is added. The resulting slurry is digested for about 2 hours at about 60° C. The magnesium ion concentration is about 0.02 moles/l. Ammonium hydroxide is added to maintain the pH at about 9.8 (measured at about 25° C.). The digested slurry is cooled to a about 35° C. and is filtered to remove the sludge from the molybdate solution. The sludge contains $MgNH_4AsO_4$ and $MgNH_4PO_4$. The phosphorus is reduced from about 50 weight ppm in the starting oxide to <10 weight ppm in the pure molybdenum trioxide which is produced from the above molybdate solution. Arsenic is reduced from about 50 weight ppm to less than about 10 weight ppm in the pure molybdenum trioxide.

EXAMPLE 2

This example involves a series of tests to determine the effect of varying amount of magnesium on the removal of As and P. Three test samples and a control are prepared as follows: about 100 g of technical grade molybdenum trioxide is stirred in about 400 ml of acid nitric acid-ammonium nitrate solution for about 2 hours at from about 75° to 85° C. The acid is decanted from the settled oxide. Water is added to restore the volume and the slurry is stirred for about 30 minutes at about 25° C. and water is decanted from the settled oxide. A second water wash is applied with agitation and the water is decanted off. The volume is adjusted with water, and about 3 ml of 50% by weight $H_2O_2$ is added to each beaker. Ammonium hydroxide is added to dissolve the molybdenum trioxide and to maintain the pH at about 9.8. Aliquots of a 2M solution of $MgCl_2 \cdot 6H_2O$ are added to provide 0.005, 0.01, and 0.015 moles Mg/l during the digestion. Magnesium is not added to the control. About a 30 minute digestion without heating precedes a 2 hour digestion at about 55° C., after which more ammonium hydroxide is added, if needed, to maintain the pH at about 9.8. Each sample is filtered after cooling to about 35° C. The compounds of $MgNH_4PO_4$ and $MgNH_4AsO_4$ are filtered out with the sludge. Each ammonium molybdate solution is converted to ammonium dimolybdate, which is then reduced to Mo metal. The Mo metal is analyzed spectrographically. The results are given in Table 1.

TABLE 1

| As and P levels in Mo Metal versus moles Mg/l in $NH_4OH$ Digestion | | |
|---|---|---|
| | Analysis of Mo metal weight ppm | |
| Moles Mg/l | As | P |
| 0 Control | 120 | 93 |

TABLE 1-continued

As and P levels in Mo Metal versus moles Mg/l in NH4OH Digestion

| Moles Mg/l | Analysis of Mo metal weight ppm | |
|---|---|---|
| | As | P |
| 0.005 | 85 | 63 |
| 0.01 | 40 | 45 |
| 0.015 | 45 | 26 |

This data shows that the method is effective in lowering the P and As levels in the molybdenum, that P is more readily removed than As, and that As requires other conditions such as higher concentration of Mg for optimizing its removal.

EXAMPLE 3

Technical grade molybdenum trioxide is acid leached and water washed and ammonia is added as in Example 1. The slurry is stirred for about 30 minutes without heating before it is heated to about 55° C. A sample is taken as a control. To the balance of the slurry is added $Mg(NO_3)_2.6H_2O$ incrementally to determine the relationship between Mg concentration and degree of removal of the As and P. About 1M $Mg(NO_3)_2.6H_2O$ solution is added to provide 0.005 moles Mg/l, and the resulting slurry is digested for about 1 hour, and then a sample is taken. More of the 1M solution is added to provide 0.01 mole Mg/l, and a sample is taken after a digestion of about 1 hour. More of the 1M Mg solution is added to provide 0.02 moles Mg/l, and a sample is taken after a digestion of about 1 hour. More of the 1M Mg solution is added to provide 0.03 moles Mg/l, and a sample is taken after a digestion of about 1 hour. Each of the sample solutions is filtered and allowed to stand. Precipitates formed in all but the control and they are removed from their respective solutions by filtration. Each ammonium molybdate sample solution is then converted to ammonium dimolybdate and then reduced to molybdenum for analysis. The results are given in Table 2.

TABLE 2

As and P levels in Mo Metal versus moles Mg/l in NH4OH Digestion

| Moles Mg/l | Analysis of Mo metal weight ppm | |
|---|---|---|
| | As | P |
| 0 Control | 21 | <10 |
| 0.005 | 14 | <10 |
| 0.01 | 20 | <10 |
| 0.02 | 12 | <10 |
| 0.03 | <10 | <10 |

The data show that removal of arsenic is related to magnesium concentration. The higher the magnesium concentration, the more arsenic is removed.

EXAMPLE 4

About 5 kilograms of magnesium hydroxide are added to an acid slurry of 4500 pounds of technical grade molybdenum trioxide. This amount of magnesium is sufficient to result in a concentration of about 0.015 moles/l. About 3 gallons of 50% by weight $H_2O_2$ are added to keep the Mo and Fe in their highest oxidation states. Ammonium hydroxide is added to dissolve the molybdenum trioxide and to provide $NH_4^+$ ions. The resulting ammoniated slurry is agitated for about 30 minutes without heating after which it is heated to about 60° C. The resulting slurry is digested for about 2 hours at about 60° C. Ammonium hydroxide is added to maintain the pH at about 9.8 (measured at about 25° C.). The digested slurry is cooled to about 35° C. and is filtered to remove the sludge from the molybdate solution. The sludge contains $MgNH_4AsO_4$ and $MgNH_4PO_4$. The As and P contents which are each about 40 weight ppm in the starting technical grade molybdenum trioxide are lowered to less than 10 weight ppm in the resulting pure molybdenum trioxide.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for purifying molybdenum containing arsenic and phosphorus, said process comprising:
    (a) adding to an acidic slurry of molybdenum trioxide, a source of magnesium ions in a solid form, with the amount of magnesium and the magnesium ion concentration in the subsequently formed ammonium molybdate solution being sufficient to subsequently form insoluble compounds containing greater than about 80% by weight of the arsenic and greater than about 80% by weight of the phosphorus, and ammonia in an amount sufficient to subsequently dissolve the molybdenum and subsequently form said insoluble compounds, with said source of magnesium ions being added prior to the addition of said ammonia;
    (b) digesting the resulting ammoniated slurry at a temperature sufficient to dissolve the molybdenum and form an ammonium molybdate solution while the pH is maintained at from about 9 to about 10 to form a solid containing said insoluble compounds; and
    (c) separating said solid from said ammonium molybdate solution.

2. A process of claim 1 wherein said molybdenum trioxide contains from about 1 to about 100 weight parts per million of phosphorus and from about 1 to about 120 weight parts per million of arsenic.

3. A process of claim 1 wherein the amount of magnesium ions is sufficient to result in a magnesium concentration of from about 0.005 to about 0.04 moles Mg/l in said molybdate solution.

4. A process of claim 1 wherein the source of magnesium ions is selected from the group consisting of magnesium oxide, magnesium hydroxide, magnesium carbonate, magnesium nitrate, magnesium chloride, magnesium sulfate, and combinations of these.

5. A process of claim 4 wherein said source of magnesium ions is selected from the group consisting of magnesium oxide, magnesium hydroxide, and combinations of these.

* * * * *

UNITED STATES PATENT AND TRADEMARK OFFICE
CERTIFICATE OF CORRECTION

PATENT NO. : 4,885,144
DATED : 12/05/89
INVENTOR(S) : Michael J. Cheresnowsky and Judy L. Scheftic It is certified that error appears in the above-identified patent and that said Letters Patent is hereby corrected as shown below:

On the title page:

Item (75) is John Cheresnowsky and should be Michael J. Cheresnowsky, Towanda, Pa and Judy L. Scheftic, South Waverly, PA Signed and Sealed this Eighteenth Day of June, 1991

*Attest:*

HARRY F. MANBECK, JR.

*Attesting Officer*   *Commissioner of Patents and Trademarks*